US008801839B2

(12) United States Patent
Vanderstraeten

(10) Patent No.: US 8,801,839 B2
(45) Date of Patent: Aug. 12, 2014

(54) METHOD AND DEVICE FOR DRYING OF A GAS

(75) Inventor: Bart Etienne Agnes Vanderstraeten, Baal (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 74 days.

(21) Appl. No.: 13/386,699

(22) PCT Filed: Aug. 10, 2010

(86) PCT No.: PCT/BE2010/000058
§ 371 (c)(1),
(2), (4) Date: Jan. 24, 2012

(87) PCT Pub. No.: WO2011/017785
PCT Pub. Date: Feb. 17, 2011

(65) Prior Publication Data
US 2012/0125198 A1    May 24, 2012

(30) Foreign Application Priority Data

Aug. 11, 2009 (BE) .................................. 2009/0483

(51) Int. Cl.
*B01D 53/06* (2006.01)
(52) U.S. Cl.
USPC ............................................. 96/125; 95/113
(58) Field of Classification Search
USPC ............................................. 95/113; 96/125
See application file for complete search history.

(56) References Cited

U.S. PATENT DOCUMENTS

| 5,242,473 | A | * | 9/1993 | Ogasahara ..................... 96/125 |
| 6,050,100 | A | * | 4/2000 | Belding et al. ................. 62/271 |
| 6,165,254 | A | * | 12/2000 | Kawakami et al. ............. 96/125 |
| 2004/0231179 | A1 | * | 11/2004 | Kodama et al. ................ 34/79 |
| 2005/0150378 | A1 | * | 7/2005 | Dunne et al. .................. 95/113 |
| 2007/0169628 | A1 | * | 7/2007 | Tetsuya et al. ................. 96/143 |

FOREIGN PATENT DOCUMENTS

WO    WO 2011017782 A1 *  2/2011

OTHER PUBLICATIONS

International Search Report in PCT/BE2010/000058, Dec. 22, 2010.
IPRP in PCT/BE2010/000058, (no date).

* cited by examiner

*Primary Examiner* — Duane Smith
*Assistant Examiner* — Phillip Shao
(74) *Attorney, Agent, or Firm* — Bacon & Thomas, PLLC

(57) ABSTRACT

Device for drying gas includes a dryer with a vessel which has at least three compartments at a first axial end of a rotor rotatably disposed in the vessel, the rotor arranged for conduction of at least three gas flows, including a main flow, a regeneration flow and a cooling flow, respectively. A first compartment of the vessel has an outlet for said main flow, a second compartment has an inlet for the cooling flow and a third compartment has an inlet for the regeneration flow. The vessel at the second axial end of the rotor has a first compartment which includes an inlet for the main flow and a second compartment with an outlet for the cooling flow and the regeneration flow.

10 Claims, 5 Drawing Sheets

METHOD AND DEVICE FOR DRYING OF A GAS

The present invention relates to a device for drying gas, more specifically, for drying compressed gas.

In particular, the invention relates to a device of the kind comprising a dryer which makes use of a vessel with a rotatably mounted rotor therein with a drying agent therein.

Devices for drying gas are already known which devices comprise a dryer comprising two zones, namely a drying zone through which a substantial portion of the gas is guided as main flow, to be dried as such after having been cooled first, and a regeneration zone for regenerating the saturated drying agent by providing a flow of a hot regeneration gas through it.

Said drying zone and regeneration zone are realized by creating compartments in the vessel at both ends of the rotor, whereby at a first end one compartment forms the inlet of the drying zone, and at the second end of the rotor, opposite to this inlet, an outlet for the main flow is provided, whereas another compartment is provided as the entry of the regeneration zone which is situated opposite an outlet of this regeneration zone at the other end of the rotor.

Because the outlet of the regeneration zone is situated at the opposite side of the outlet of the main flow, the gas flow for regenerating the drying agent is guided in counter flow through the dryer with respect to the flow direction of the main flow in these known devices.

In this case use is made of the fact that the compressed gas has such a high temperature and consequently such a low relative moisture content, that a portion thereof can be used for regenerating the drying agent.

The gas used for regeneration will heat the drying agent and consequently the moisture present in the drying agent will evaporate and will be discharged together with the gas flow, in order to be guided, possibly after cooling, through the drying zone together with the main flow.

By enabling rotation of the rotor, the drying agent in the rotor is guided alternately through the drying zone and the regeneration zone, such that the drying agent is used alternately as drying agent in the drying zone, which is, after saturation or partial saturation, subsequently regenerated in the regeneration zone in order to be used again afterwards for drying in the drying zone.

For an optimal working operation of the device, it is desirable that the drying agent in the drying zone has a temperature as low as possible, when it comes into contact with the main flow, otherwise this drying agent heats the main flow, which causes an undesired increase of the dew point of the dried gas at the exit from the drying zone.

Conventionally, a portion of the cooled main flow is used for cooling the hot regenerated drying agent at the transition between the regeneration zone and the drying zone before said drying agent comes into contact with the main flow in the drying zone.

Under normal working conditions of the device, it is ensured that the outlet of the regeneration zone remains under a lower pressure than the outlet of the drying zone situated at the opposite side of the rotor, such that a portion of the cold main flow flows from the outlet of the drying zone to the outlet of the regeneration zone through a zone situated between the drying zone and the regeneration zone.

By guiding this flow through the zone between the drying zone and the regeneration zone, the hot regenerated drying agent will be cooled advantageously before said drying agent is used for drying the main flow.

A disadvantage thereof is that not under all working conditions of the device, such as for instance under partial load, enough low pressure will be available for guiding a portion of the main flow through said zone, situated between the drying zone and the regeneration zone, so as to cool the hot regenerated drying agent.

Another disadvantage consists in that the gas flow which flows through the zone situated between the drying zone and the regeneration zone cannot be controlled. However extensive research has revealed that the inlet conditions, in particular the temperature and the moisture content of this gas flow, have an important influence on the performance of the device.

The pressure in the compartment, which forms the inlet for the regenerating flow, is always higher than the pressure in the compartment which fools the outlet of the drying zone, due to the pressure drop across, on the one hand, the cooler used for cooling the main flow, and on the other hand, across the rotor.

This is disadvantageous in that leakage of a portion of the hot gas, used for regeneration, towards the other compartment which discharges the dried gas, could occur, which would cause an unwanted increase of the dew point of the dried gas.

The present invention aims to overcome one or more of the above mentioned and/or other disadvantages.

To that end, the invention relates to a device for drying gas, consisting of a dryer of the type comprising a vessel with therein a rotatably mounted rotor with a drying agent therein, and which is also provided with driving means for enabling rotation of said rotor, such that said drying agent is moved successively through a drying zone, a regeneration zone and a cooling zone, with the characteristic that at a first axial end of the rotor the vessel is divided into at least three compartments for guiding at least three gas flows, a main flow, a cooling flow and a regeneration flow, respectively, whereby a first compartment comprises a main outlet for said main flow, a second compartment comprises an inlet for the cooling flow, and a third compartment comprises an inlet for the regeneration flow, and, that at a second axial end said vessel is divided into two compartments, namely a first compartment which comprises an inlet for the main flow and a second compartment which comprises a common outlet for the cooling flow and the regeneration flow.

In this case, said "compartments" define spaces that are separated from each other. In other words, the inlet for the cooling flow is completely separated from said main outlet for the main flow and from the inlet for the regeneration flow.

An advantage of the invention is that, in this way, thanks to the separation of the cooling flow from the other gas flows flowing through the dryer, an improved control of said cooling flow is possible. As such, the inlet conditions of this cooling flow can be controlled better, for example by making use of possible conditioning means provided to that end, like a regulating valve, a heat exchanger, or the like.

Preferably, said second compartment at the first end of the rotor comprises an additional outlet for the main flow.

In a practical embodiment, the second compartment at the first end of the rotor is provided with two sub-compartments, respectively, a first sub-compartment comprising said additional outlet for the main flow, and a second sub-compartment comprising the inlet for the cooling flow, whereby these two sub-compartments are interconnected by means of connection means provided to that end.

For instance, said connection means may consist of one or more openings in a partition wall between said first sub-compartment and said second sub-compartment.

According to a more preferred variant, the connection is realized by choosing the dimensions of a partition wall between said sub-compartments such that between an upper edge of this partition wall and a top wall of the dryer a passage or channel is created through which a portion of the main flow is guided.

As a result thereof a portion of the main flow, after flowing through the rotor, can be used as cooling flow.

An advantage thereof is that such device can be made compact, because the cooling flow is available within one and the same device. In other words, it is not necessary to provide conduits and the like for supplying an external cooling flow.

According to yet another preferred characteristic, said second sub-compartment is situated axially opposite to a part of the first compartment at the second end of the rotor.

An advantage of said embodiment consists in that such device is provided with a separate compartment (particularly, the second compartment at the first end of the rotor) for collecting a portion of the dried gas. As such, said gas portion is separated from the main flow of dried gas, as a result of which this gas portion can be treated in the best way in view of its subsequent use as cooling flow.

Preferably, said third compartment, which forms the inlet for the regeneration flow, is partially or completely enclosed by the second compartment.

In other words, according to a preferred embodiment, during the use of the device, the third compartment is for the greater part surrounded by said separated gas portion of the main flow. This gas portion flows via said third compartment to be used subsequently as gas flow for the cooling of the drying agent.

An important advantage thereof is that any leakage of the hot gas flow, used for regeneration, towards the main flow is avoided.

The invention also relates to a method for drying gas using a dryer of the kind comprising a vessel with therein a rotatably mounted rotor with a drying agent therein and driving means for enabling rotation of said rotor, whereby this method comprises the following steps of, providing at a first end of said rotor at least one first compartment which comprises a main outlet for a main flow of gas to be dried; providing a second compartment which comprises an inlet for a cooling flow for cooling the drying agent; and, providing a third compartment which comprises an inlet for a regeneration flow for regenerating the drying agent and, whereby, as a result of the presence of said compartments, said inlet for the regeneration flow remains completely separated from said main outlet for the main flow.

Said method according to the invention is preferably characterized in that a portion of the main flow, after flowing through the rotor, is used as cooling flow, whereby, according to a preferred characteristic of the invention, the cooling flow of the main flow is branched off via a first sub-compartment of said second compartment at the first end of the rotor which connects to a second sub-compartment of the second compartment at the first end of the rotor, whereby this second sub-compartment comprises said inlet for the cooling flow.

The advantages of such a method are similar to the advantages offered by a device according to the invention.

In order to better explain the characteristics of the invention, a preferred embodiment of the device according to the invention is described, by way of example, without being limitative in any way, with reference to the accompanying drawings, whereby:

Figure 2:
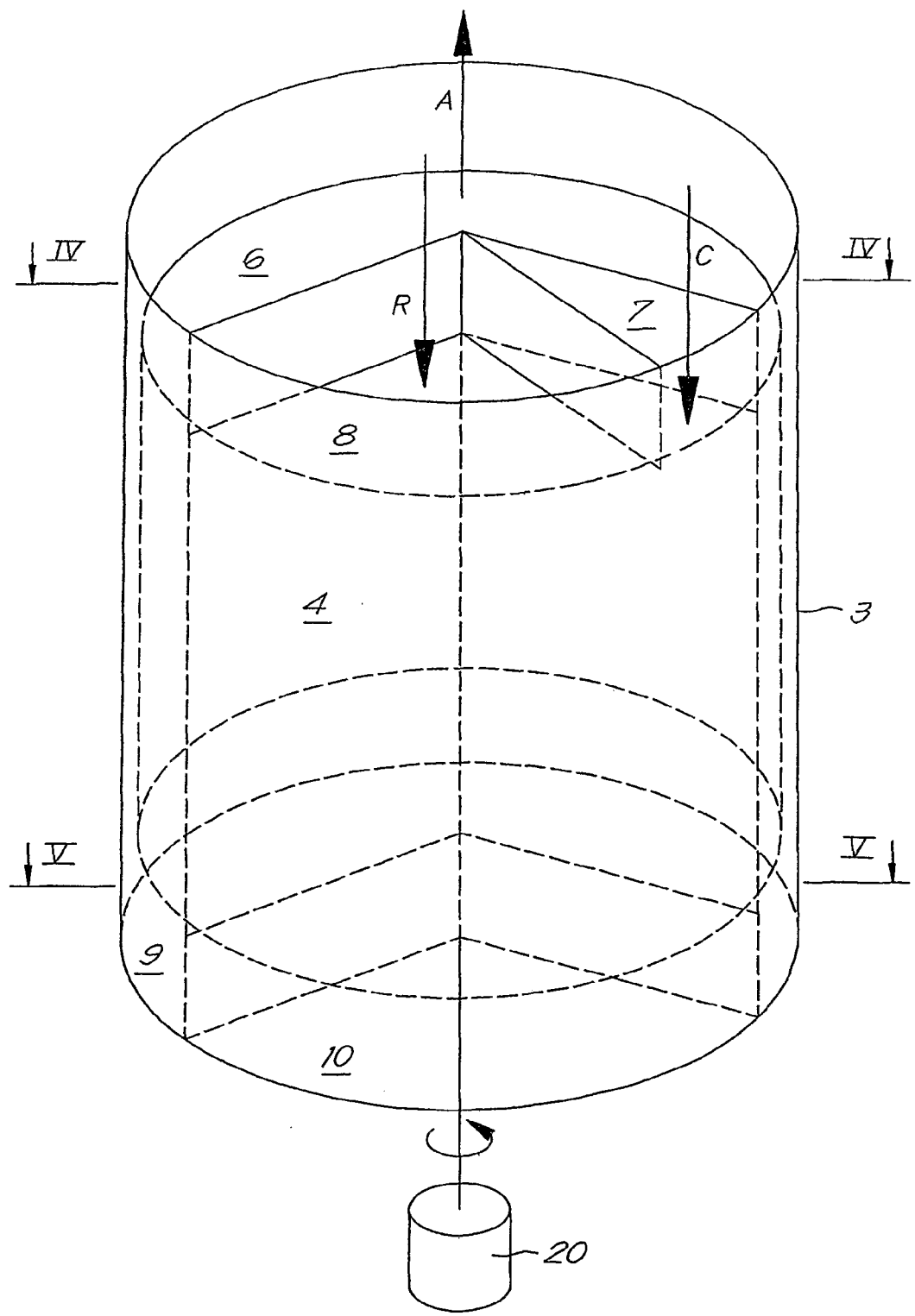
FIG. 2 represents schematically a part of a vessel with a rotor of a device according to the invention.
Figure 3:
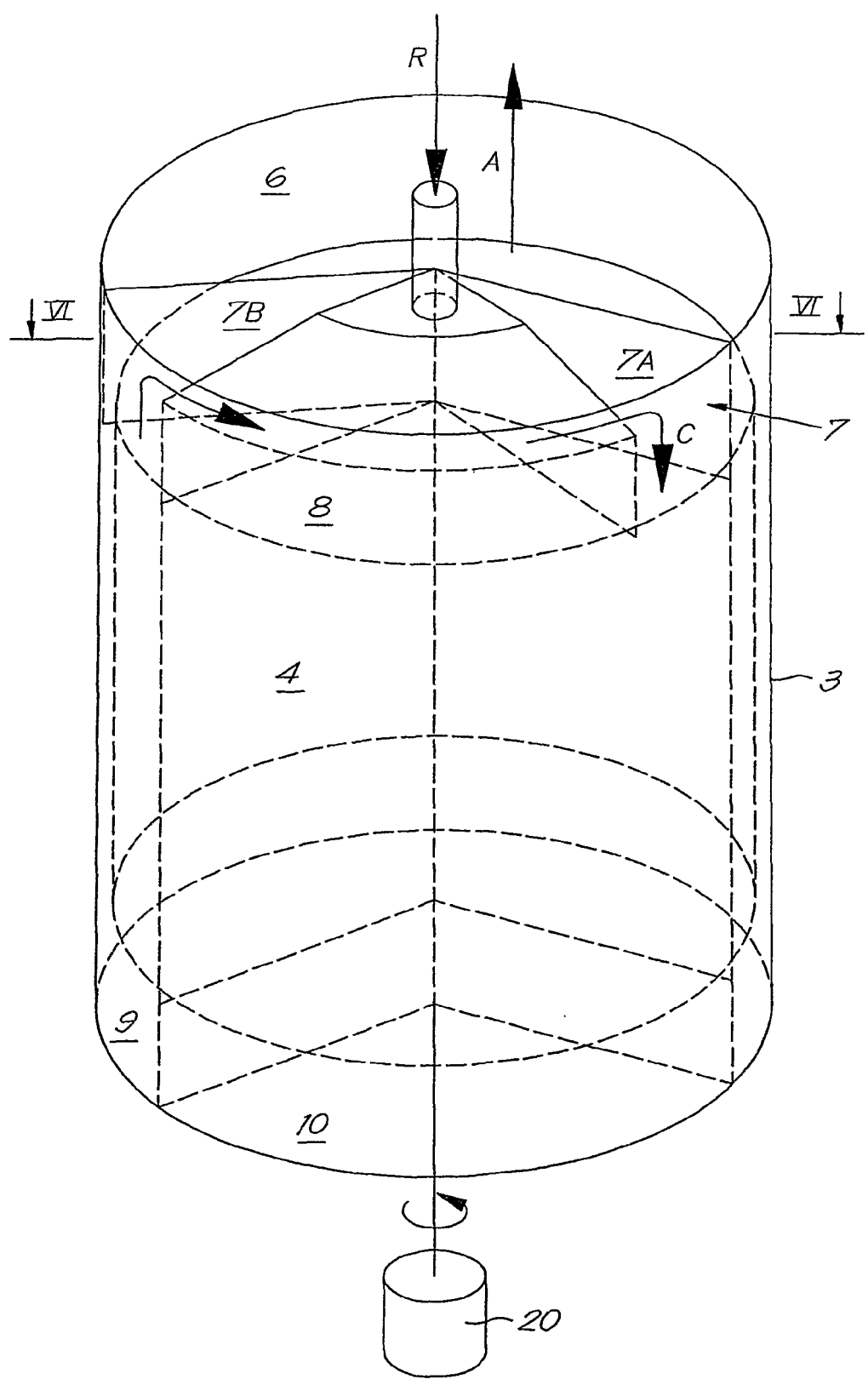
FIG. 3 represents a variant of FIG. 2.
Figure 4:
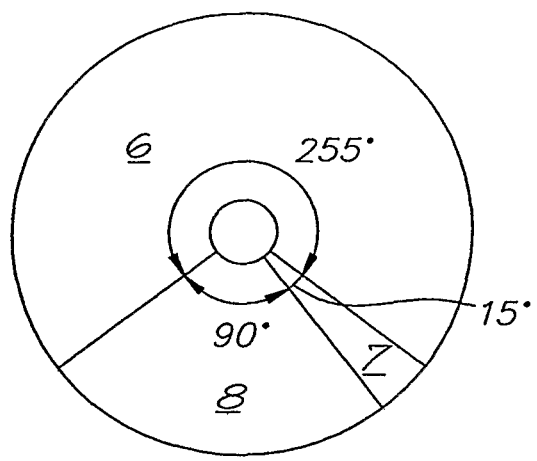
Figure 5:
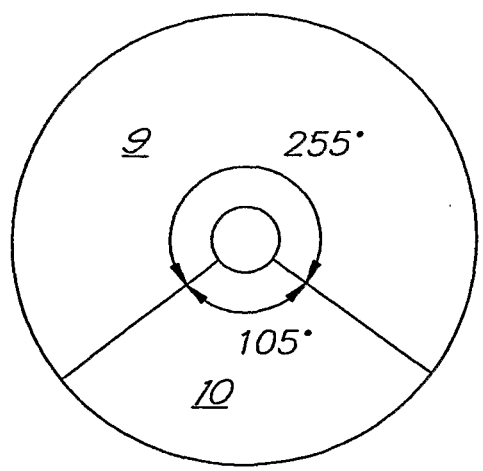
Figure 6:
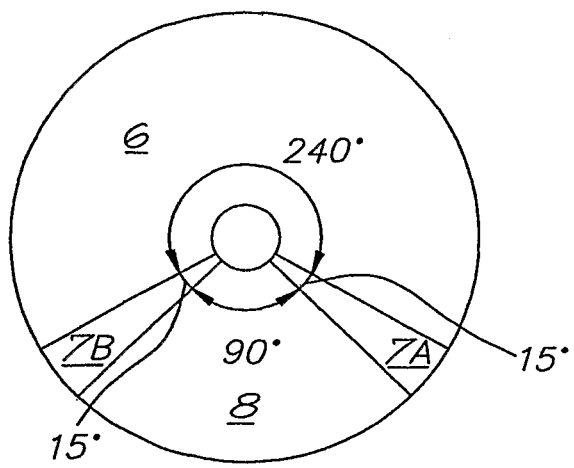
Figure 7:
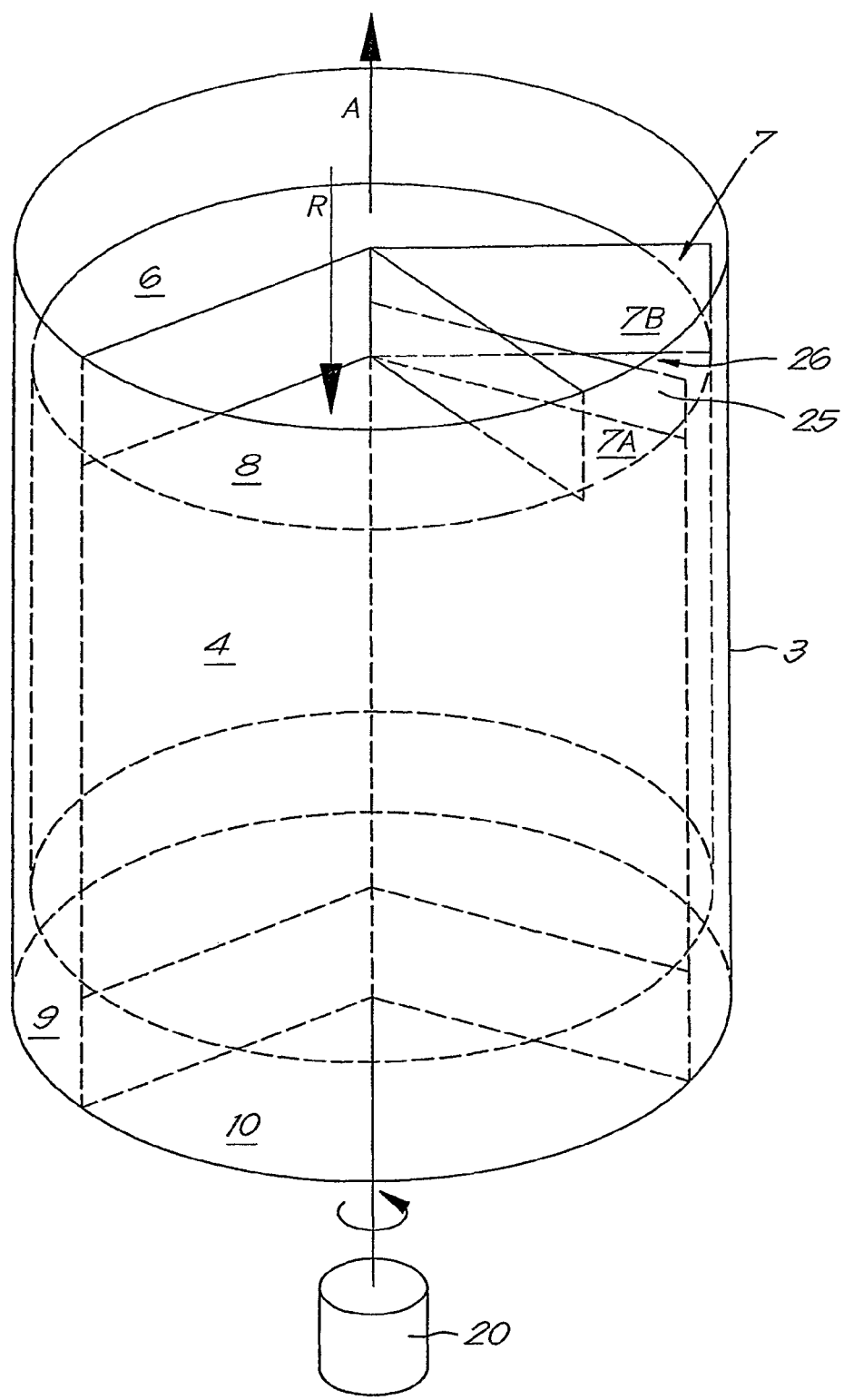

FIGS. 4 and 5 each represent a cross section of the vessel, along line IV-IV and line V-V in FIG. 2, respectively;

FIG. 6 shows a cross section of the vessel along line VI-VI in FIG. 3;

FIG. 7 shows another variant of FIG. 2.

Figure 1:
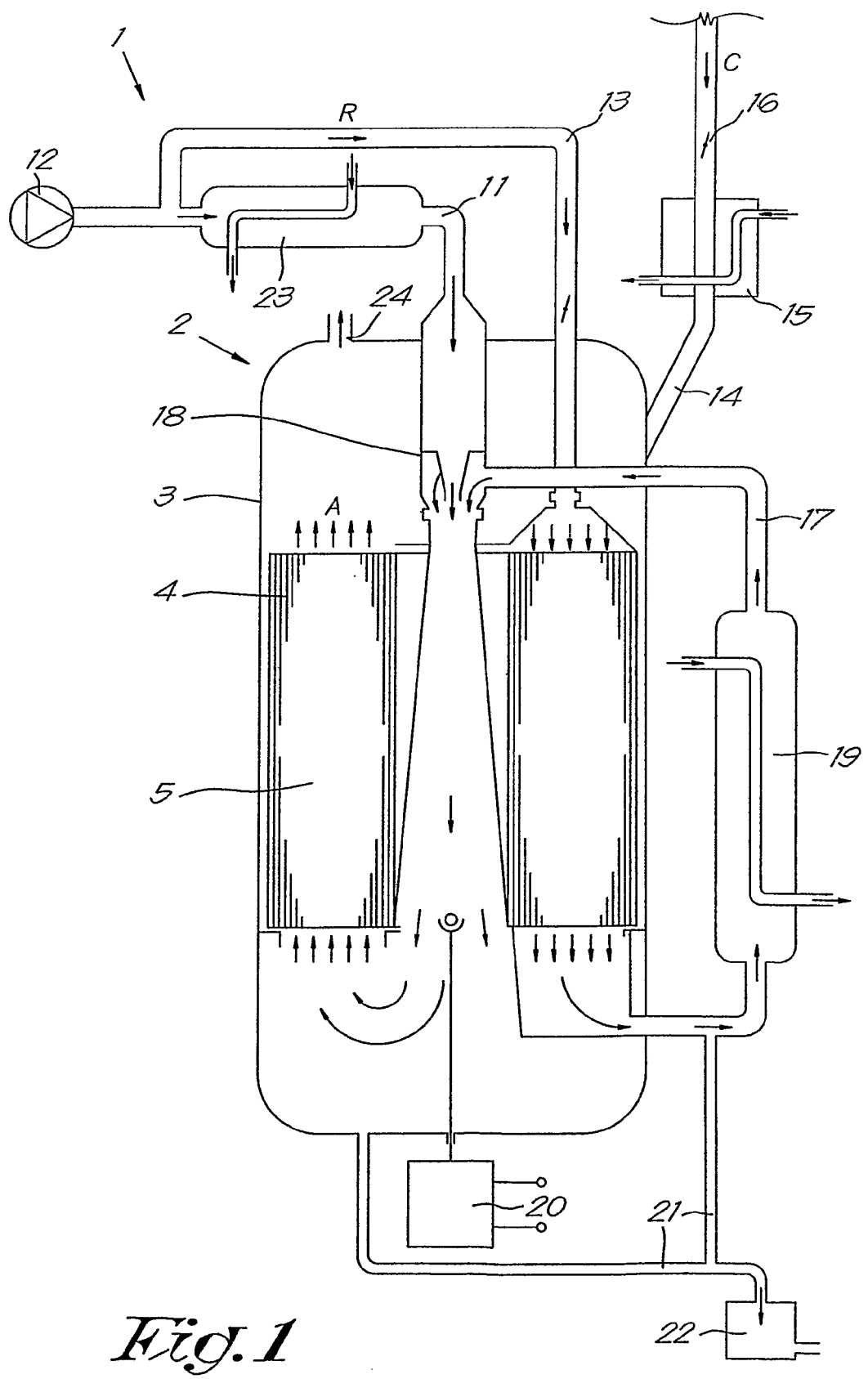
FIG. 1 represents schematically and in cross section a device according to the invention.

In FIG. 1 a device 1 according to the invention for drying gas is represented, which mainly consists of a dryer 2 of the type making use of a vessel 3 with therein a preferably cylindrically shaped rotatably mounted rotor 4 with a regenerable drying agent 5 therein, like silica gel or the like, which is situated in axially extending channels in the rotor 4 for instance.

As represented in FIG. 2, the vessel 3 comprises at a first end of the rotor 4, in this case at the top, at least three compartments, a first, a second and a third compartment, respectively, whereby the first compartment 6 comprise a main outlet for gas to be dried, hereafter designated as the main flow, whereby the second compartment 7 comprises an inlet for a cooling flow, and whereby the third compartment 8 comprises an inlet for the regeneration flow, which can for example, although not necessary, be branched off, from the gas to be dried.

At the other, second end of the rotor 4, in case of FIG. 2 at the bottom, the vessel 3 comprises at least, two compartments, whereby a first compartment 9 comprises an inlet for said main flow, and whereby a second compartment 10 comprises a common outlet for the cooling flow and the regeneration flow.

As shown in FIG. 2, the compartments at both ends of the rotor 4 are made such that they guide the gas flows through a circle segment of the rotor 4.

In this way, the rotor 4 is principally subdivided into three zones, namely a drying zone extending between said inlet and the main outlet for the main flow, a regeneration zone between the inlet and the outlet of the gas flow used for regeneration (i.e. the regeneration flow), and a cooling zone situated between the inlet and the outlet for the gas used for cooling (i.e. the cooling flow).

In this case, the device 1 further comprises a first canalization 11 which forms a connection between a gas supply, in this example the outlet of a compressor 12, and the inlet for the main flow.

Furthermore, the device 1 of this example comprises a branch 13 for branching off an amount of gas at the outlet of the compressor 12, which amount of gas is used for regeneration of the drying agent 5. To that end, said branch 13 is connected to the third compartment 8 at the first end of the rotor 4, which third compartment 8 forms the inlet for the regeneration flow.

The gas flow used for cooling the drying agent 5, is supplied via a second canalization 14 to the compartment 7 that comprises the inlet for the cooling flow.

In this case, said cooling flow is supplied from an external device, not shown in the figure. Preferably, the second canalization 14 is provided with conditioning means, in this case in the form of a cooler 15 and a regulating valve 16, for ensuring control of the inlet conditions of the cooling flow.

Furthermore, a feedback 17 is provided for the gas flow which is used for regeneration and cooling, which feedback 17 connects the second compartment 10 at the second end of the rotor 4 to said first canalization 11 and ends up into it nearby a venturi 18 which is applied in the first canalization 11. In this example a cooler 19 has been provided in the feedback 17.

As is known, the dryer 2 is further provided with driving means for enabling rotation of the rotor 4, which driving means preferably, however, not necessarily, are made in the shape of an electrical motor 20 which is, whether or not, provided with a reduction casing for limiting the rotational speed of the rotor, for example to a number of seven revolutions per hour.

In the example as shown, the device 1 is provided with the necessary draining means for draining off condensate. In the example of FIG. 1, said means consist of conduits 21 which collect the condensate coming from the cooler 19 and at the bottom of the first compartment 9 at the second end of the rotor 4, which condensate is discharged by the conduit 21 towards a reservoir 22 or a drain installation for possible further treatment.

Preferably, the compartments are made such that the gas flow for regeneration is guided through a circle segment of, in this case, 90 degrees, and the cooling flow is guided through a circle segment of, for example, 15 degrees of the rotor 4, whereby the main flow is guided through the remaining part of for example 255 degrees of the rotor 4. The second compartment 10 which comprises the outlet for the gas flows used for regeneration and cooling, covers an angle of 105 degrees in said embodiment.

FIG. 4 shows a cross section of the compartments situated at the first axial end of the rotor 4. FIG. 5 shows a cross section of the compartments situated at the second axial end of the rotor 4.

It should be noted that other ratios are not excluded.

The flow direction of the three gas flows through the vessel 3 is represented in the figures, by means of arrow R for the regenerating flow, arrow C for the cooling flow, and the arrow A which indicates the flow direction of the main flow.

The working of the device may be described as follows.

The gas is compressed by the compressor 12 after which, in this example, the compressed gas flow is divided into a main flow and a branched off regeneration flow.

The main flow is guided via the first canalization 11 through the cooler 23 and the venturi 18 towards the inlet of the drying zone, formed by the first compartment 9 at the bottom side of the vessel 3.

The main flow flows subsequently through the drying agent 5 in the drying zone and via the main outlet towards the outlet of the vessel 3, where an outlet 24 is provided, from where the dried gas is able to be branched off for further use in a compressed air application situated downstream.

Due to the contact of the main flow with the drying agent 5, the moisture present in the main flow is adsorbed by said drying agent 5.

The cooler 23 ensures that said main flow can easily convey moisture to the drying agent 5. It should be noted in this case that, the lower the temperature of the main flow, the more moisture will be adsorbed by the drying agent 5.

The branched off gas flow is guided via a branch towards the third compartment 8 which forms the inlet of the regeneration zone.

The rotor 4 transfers the moisture-laden drying agent 5 to the regeneration zone, where the moisture present in the drying agent 5 is evaporated by bringing the drying agent 5 into contact with the branched off gas flow (i.e. the regeneration flow), whereby this regeneration flow, with the moisture that has been taken up, is guided via the cooler 19 in the feedback 17 towards the venturi 18 in the first canalization 11, and, whereby the moisture condensates in the cooler 19 and is discharged via the conduit 21 towards the reservoir 22.

As the rotor 4 rotates further, the more and more moisture will be extracted from the drying agent 5 until the moment the drying agent 5 reaches the drying zone, free from the adsorbed moisture, such that the thus regenerated drying agent 5 can be used for a next cycle of drying in the drying zone.

As such the drying agent 5 is guided alternately through the drying zone and subsequently through the regeneration zone in a continuous or discontinuous movement of revolution.

The cooling flow is guided via a second canalization 14 to the second compartment 7 at the upper side of the pressure vessel 3 and is subsequently guided via the cooling zone, through the drying agent 5, towards the outlet, where it is fed back, together with the regeneration flow, via the cooler 19 towards the main flow upstream of the drying zone.

By providing a cooling zone, the temperature of the drying agent 5 after regeneration, is sufficiently lowered before the drying agent 5 comes into contact with the main flow in the drying zone resulting in a positive effect on the performance of the installation 1.

Characterizing for the invention is that the vessel 3 is provided with a second compartment 7 comprising an inlet for the cooling flow, and which second compartment 7 is completely separated from the first compartment 6 and from the third compartment 8. This allows to make the inlet conditions of the cooling flow more controllable because this cooling flow at the inlet side is completely separated from the main outlet for the main flow and from the inlet for the regenerating flow by means of a compartment 7, resulting in a positive effect on the performance of the installation.

The regulating valve 16 allows determining the desired amount of externally supplied gas which is used for the cooling the drying agent 5.

FIG. 3 represents a preferred embodiment of a device 1 according to the invention comprising a vessel 3 which is provided at a first axial end of the rotor 4 with a second compartment 7 consisting of two sub-compartments, a first sub-compartment 7A comprising an inlet for said cooling flow, and a second sub-compartment 7B comprising an additional outlet for the main flow.

However, the greatest part of dried gas, after flowing through the rotor 4, ends up in the first compartment 6, after which this gas portion leaves the device 1 to be used further in an application situated downstream.

According to said preferred embodiment, the first sub-compartment 7A comprising an inlet for the cooling flow, is connected to the second sub-compartment 7B comprising the additional outlet for a portion of the main flow of dried gas.

Such embodiment implies that a portion of the main flow, after flowing through the rotor 4, is used as gas flow for cooling the drying agent 5.

According to the embodiment shown in FIG. 3, the first and the second sub-compartments, 7A, 7B, respectively, enclose completely the third compartment 8 which forms the inlet for the regeneration flow.

Consequently, in case of leakage of the gas flow, used for regeneration, to an adjacent compartment, the pressure difference between the compartments results in that the main flow cannot be contaminated with humid hot gas coming from the inlet of the regeneration zone.

According to the preceding preferred embodiment, the three gas flows are guided through adjacent circle segments of the rotor 4, whereby the regeneration flow is guided through a circle segment of for example 90 degrees and whereby the cooling flow, used for cooling, is guided through a circle segment of for example 15 degrees.

As shown in FIG. 6, it is preferred, although not necessary, that the second sub-compartment 7B extends over a circle segment of 15 degrees as well.

In FIG. 7 another variant of the dryer according to the invention is represented, the first sub-compartment 7A and the second sub-compartment 7B lying next to one another, and whereby the second sub-compartment 7B comprises the additional outlet for the dried gas, which is connected to said first sub-compartment 7A by means of connection means provided to that end.

Said connection means are realized, in the non-limiting example of FIG. 7, by a partition wall 25 between said first and second sub-compartments 7A and 7B having suitable dimensions such that a passage 26 or channel between an upper edge of this partition 25 and a top wall of the dryer 2 is created, through which a portion of the main flow is guided from the second sub-compartment 7B towards the first sub-compartment 7A. According to the invention, the presence of such a partition wall 25 is not a requirement.

From the preceding it is obvious that in the variants of FIGS. 3 and 7 a portion of the main flow, after flowing through the rotor 4, is used as cooling flow.

Consequently, the device 1 can be made easier and compacter because a separate external cooling flow supply is not strictly required. It is obvious that the venturi 18 in the first canalization 11 is not strictly necessary and that, for example, the first canalization 11 after cooler 23 can connect directly to the bottom side of the vessel 3.

The present invention is by no means limited to the embodiments described by way of example and represented in the drawings, however, a device and method according to the invention, for drying gas, can be realized according to different variants without departing from the scope of invention.

The invention claimed is:

1. Device for drying gas, comprising:
a dryer vessel having a rotatably mounted rotor therein which contains a drying agent and a driving device arranged to rotate said rotor, said drying agent, upon rotation of the rotor, being successively moved through a drying zone, a regeneration zone and a cooling zone of the vessel;
said vessel being divided, at a first axial end of the rotor, into at least three compartments for guiding at least three gas flows;
said gas flows comprising a main flow, a regeneration flow, and a cooling flow;
a first of said compartments comprising a main outlet for said main flow, a second of said compartments comprising an inlet for the cooling flow, and a third of said compartments comprising an inlet for the regeneration flow;
said vessel further comprising at least two additional compartments at a second axial end of the rotor;
a first of said additional compartments comprising an inlet for the main flow and a second of said additional compartments comprising a common outlet for the cooling flow and the regeneration flow;
said second compartment at the first end of the rotor comprising an additional outlet for the main flow and including two sub-compartments;
a first of said sub-compartments comprising said inlet for the cooling flow and a second of said sub-compartments comprising said additional outlet for the main flow;
said two sub-compartments being connected to and in communication with each other.

2. The device according to claim 1, wherein said second sub-compartment is axially positioned opposite a part of the first compartment at the second end of the rotor.

3. The device according to claim 1, wherein the rotor is cylindrically shaped so that the compartments, at both ends of the rotor, guide the gas flows through a circular sector of the rotor.

4. The device according to claim 2, wherein at the first end of the rotor, the first subcompartment, the third compartment and the second sub-compartment, guide respective gas flows through adjacently located circular sectors of the rotor.

5. The device according to claim 1, wherein said first and second sub-compartments enclose said third compartment at least partially.

6. The device according to claim 1, including a conditioning control device arranged to control the inlet conditions of the cooling flow.

7. Device for drying gas, comprising:
a dryer vessel having a rotatably mounted rotor therein which contains a drying agent and a driving device arranged to rotate said rotor, said drying agent, upon rotation of the rotor, being successively moved through a drying zone, a regeneration zone and a cooling zone of the vessel;
said vessel being divided, at a first axial end of the rotor, into at least three compartments for guiding at least three gas flows;
said gas flows comprising a main flow, a regeneration flow, and a cooling flow;
a first of said compartments comprising a main outlet for said main flow, a second of said compartments comprising an inlet for the cooling flow, and a third of said compartments comprising an inlet for the regeneration flow;
said vessel further comprising at least two additional compartments at a second axial end of the rotor;
a first of said additional compartments comprising an inlet for the main flow and a second of said additional compartments comprising a common outlet for the cooling flow and the regeneration flow, wherein the common outlet is located in the vessel;
said second compartment at the first end of the rotor comprising an additional outlet for the main flow and including two sub-compartments;
a first of said sub-compartments comprising said inlet for the cooling flow and a second of said sub-compartments comprising said additional outlet for the main flow;
said two sub-compartments being connected to and in communication with each other.

8. The device according to claim 7, wherein the two sub-compartments completely enclose the third compartment.

9. Device for drying gas, comprising:
a dryer vessel having a rotatably mounted rotor therein which contains a drying agent and a driving device arranged to rotate said rotor, said drying agent, upon rotation of the rotor, being successively moved through a drying zone, a regeneration zone and a cooling zone of the vessel;
said vessel being divided, at a first axial end of the rotor, into at least three compartments for guiding at least three gas flows;
said gas flows comprising a main flow, a regeneration flow, and a cooling flow;
a first of said compartments comprising a main outlet for said main flow, a second of said compartments comprising an inlet for the cooling flow, and a third of said compartments comprising an inlet for the regeneration flow;
said vessel further comprising at least two additional compartments at a second axial end of the rotor;

a first of said additional compartments comprising an inlet for the main flow and a second of said additional compartments comprising a common outlet for the cooling flow and the regeneration flow;

said second compartment at the first end of the rotor comprising an additional outlet for the main flow and including two sub-compartments;

a first of said sub-compartments comprising said inlet for the cooling flow and a second of said sub-compartments comprising said additional outlet for the main flow;

said two sub-compartments being connected to and in communication with each other, and wherein the two sub-compartments completely enclose the third compartment.

10. The device according to claim 9, wherein the common outlet is located in the vessel.

* * * * *